Feb. 9, 1965

E. NINES 3,169,185

TOTALIZER

Filed July 27, 1961

INVENTOR.
EUGENE NINES
BY
ATTORNEYS

INVENTOR.
EUGENE NINES

INVENTOR.
EUGENE NINES

United States Patent Office 3,169,185
Patented Feb. 9, 1965

3,169,185
TOTALIZER
Eugene Nines, Levittown, Pa., assignor to Fischer & Porter Company, Warminster, Pa., a corporation of Pennsylvania
Filed July 27, 1961, Ser. No. 127,370
6 Claims. (Cl. 235—160)

This invention relates to totalizers for accumulating input counts indicative of some measurement. The invention particularly relates to a totalizer in which input pulses are multiplied by a presettable factor for the purpose of giving an ultimate count in terms of quantity units which are desired.

While the invention is more broadly applicable, its application to the indication or recording of total flow of a fluid is typical and will serve to exemplify the uses of the invention. Accordingly, the following description will be given in terms of application of the invention to a flowmeter, from which it will become obvious that the invention is applicable to many other uses.

A turbine flowmeter involving a rotating runner may conveniently provide an output in the form of pulses by rotation of its ferromagnetic blades adjacent to a permanent magnet carrying a winding, thereby producing a more or less sinusoidal electrical output. This output may be transformed into properly shaped pulses which may then be counted to give a measure of total flow over some given period of time. The mere count of such pulses may give, by computation, a measure of flow, taking into account the calibration of the meter. But it is highly desirable to provide visually or for the production of a record a direct indication of the flow in suitable pertinent units. This involves, in effect, multiplying the count of original pulses by a factor which combines the meter calibration and the transformation to the desired units. The latter may be in cubic feet, gallons, barrels, liters, or the like, depending on the usage in the industry to which the meter is applied. Further, the ultimate units desired may be in terms of weight in cases where the specific gravity remains essentially constant.

The broad object of the present invention is to provide a totalizer in which multiplication by a suitable factor takes place, the factor being presettable in the apparatus by the manipulation of dials and preferably in a decimal system. The invention further involves an extensive range of the factor from zero to substantially two, or to substantially some higher integer.

The foregoing general objects and others which relate to details of construction and operation will become apparent from the following description, read in conjunction with the accompanying drawings, in which.

Figure 1:
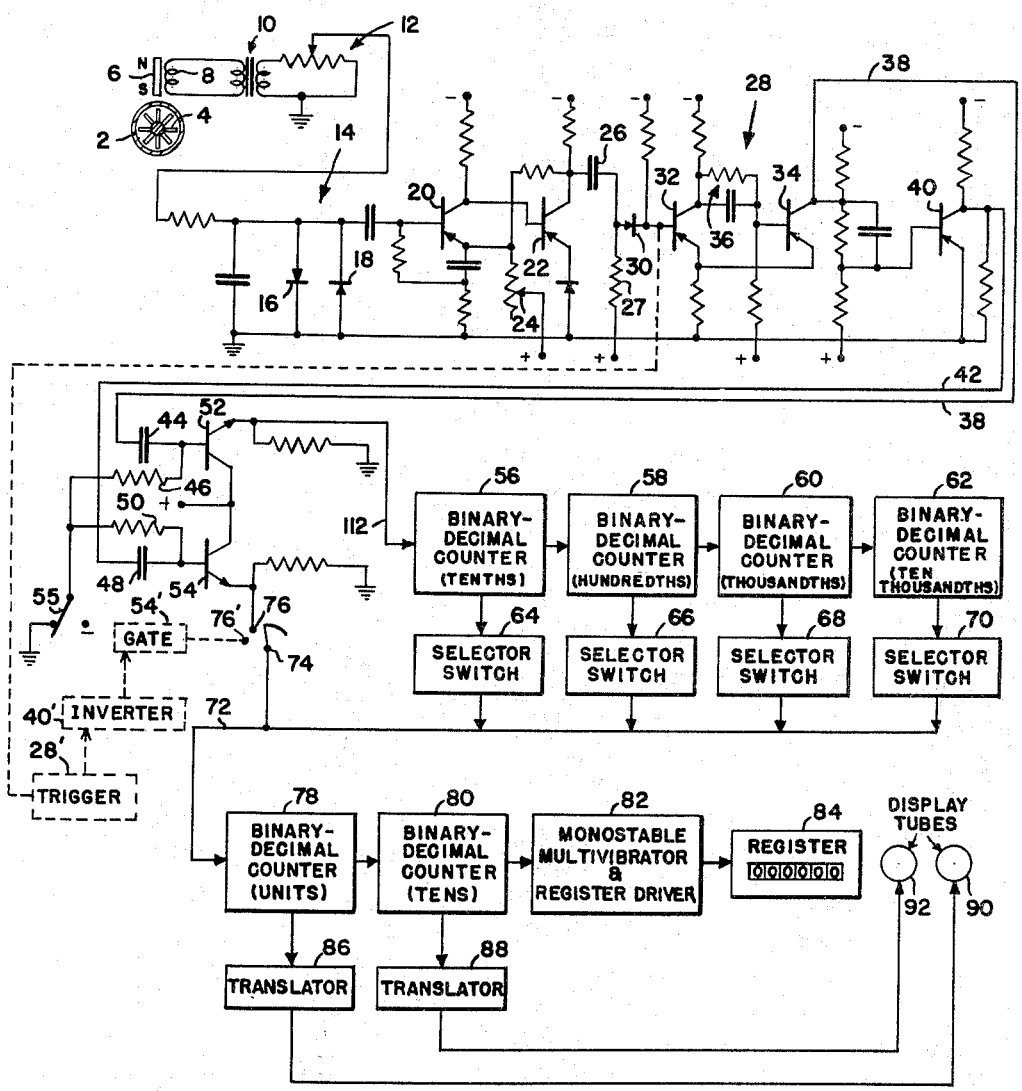
FIGURE 1 is a combined wiring and block diagram showing the overall construction of a preferred form of apparatus embodying the invention.

Referring first to FIGURE 1, there is indicated at 2 a conduit for fluid, either liquid or gaseous, the flow of which produces rotation of a turbine diagrammed at 4 constituting the active part of a flowmeter. Turbines of this type capable of measuring flow are conventional and detailed description thereof is unnecessary. If the blades of such a turbine are of magnetic material, or, if of other material, contain inserts of magnetic material, their rotation may give rise to output pulses by locating adjacent to them a permanent magnet 6 provided with a winding 8, the assembly then acting as a generator producing an approximately sinusoidal waveform. To utilize this output it is fed to the primary of an impedance-matching transformer 10 and thence to an adjustable attenuator 12 from which the signals are delivered through a suitable network 14 desirably including a pair of limiter diodes 16 and 18 to limit the magnitude of the signals delivered to an amplifier. Since the magnitude of the signals generated in winding 8 depends on the speed of the turbine 4, it is also desirable to provide a network 14 having the characteristic of attenuating to a greater extent signals of higher frequency as compared with signals of lower frequency, this expedient serving further to provide signals of more uniform amplitude to the amplifier. Such a network is usually referred to as a roll-off filter.

The amplifier illustrated is generally conventional and comprises the transistors 20 and 22 in usual circuitry, with adjustable bias provided to the emitter of transistor 20 by variation of resistance at 24. Coupling from the amplifier is through capacitor 26. Positive pulses are used for operation and these are passed by the diode 30, biased through resistor 27, which suppresses negative pulses.

The diode 30 is connected to a conventional trigger circuit 28 which may be (as shown) of the Schmitt type, or may be a monostable multivibrator. It comprises the transistors 32 and 34, the former being normally conducting and the latter normally nonconducting, and the network 36. This circuit is such that positive input signals will throw it to its astable state from which it will return when the positive signals drop to zero. Pulses are delivered to line 38 from the collector of transistor 34. This collector is also connected to the base of a transistor 40 which provides phase inversion, and has its collector connected to a second line 42. As a result of this arrangement pulses are provided on both lines, but these pulses are approximately 180° out of phase with each other. Accordingly, from the standpoint of their rises, they alternate. The respective pulses are delivered through differentiating networks, that connected to line 38 being provided by capacitor 44 and resistor 46, while that connected to line 42 is provided by capacitor 48 and resistor 50. The differentiated sharp pulses, which also alternate, are respectively delivered to the NPN driver transistors 52 and 54.

A switch 55 is provided either selectively to ground the left-hand ends of resistors 46 and 50 to render the transistors 52 and 54 active, or to render their bases negative to cut them off and interrupt the transmission of pulses. Switch 55 acts, accordingly, as a start-stop switch for counter operation.

The emitter of transistor 52 feeds positive pulses to the input of a first binary-decimal counter 56 which is arranged in cascade with the binary-decimal counters 58, 60 and 62. As will more fully appear hereafter, these effect division of the input counts by successive powers of 10.

The counters 56, 58, 60 and 62, respectively, deliver outputs to selector switches 64, 66, 68 and 70 which in turn deliver their outputs to the common summation line 72. The functions of the counters and selector switches will become apparent from detailed discussion later.

To the same line 72 there are delivered positive pulses from the emitter of transistor 54 through a switch 74 which may be alternatively opened or closed against a contact 76. As will appear later when the switch is open a factor is introduced depending upon the selected positions of switches 64, 66, 68 and 70. When the switch 74 is closed the effect is to add 1 to the factor selected by the switches.

The line 72 feeds positive pulses to the binary-decimal counters 78 and 80 arranged in cascade, the output from the latter providing as its output 1/100 of the number of pulses received from the line 72. The pulses thus divided are used to actuate a mechanical register 84, and for the purpose of driving this register the pulses are fed to a monostable multivibrator and register driver unit 82. This last is conventional and need not be described, its purpose being merely to provide pulses of sufficient duration and magnitude to effect positive operation of the mechanical register. The register, as is conventional, is provided with the usual electrical reset (not shown). The pulses on line 72 follow each other ordinarily much too rapidly to effect mechanical registration of individual pulses, and for this reason the pulse dividing arrangement of the counters 78 and 80 is provided. However, for fine measurements it is desirable to indicate each pulse on the line 72, and for this purpose the counters 78 and 80 are respectively connected through translators 86 and 88 to the respective units and tens display tubes 90 and 92 which may be glow tubes of the type containing stacked cathodes in the shape of numerals which will be illuminated selectively in accordance with inputs to the tubes. For the control of the tube electrodes the translators are provided and these, at 86 and 88, are of conventional type in the form of resistor matrices associated with driver transistors. Such translators transform the states of the binary-decimal counter units into suitable individual signals to the various cathodes of the display tubes, and form no part of the present invention.

Figure 2:
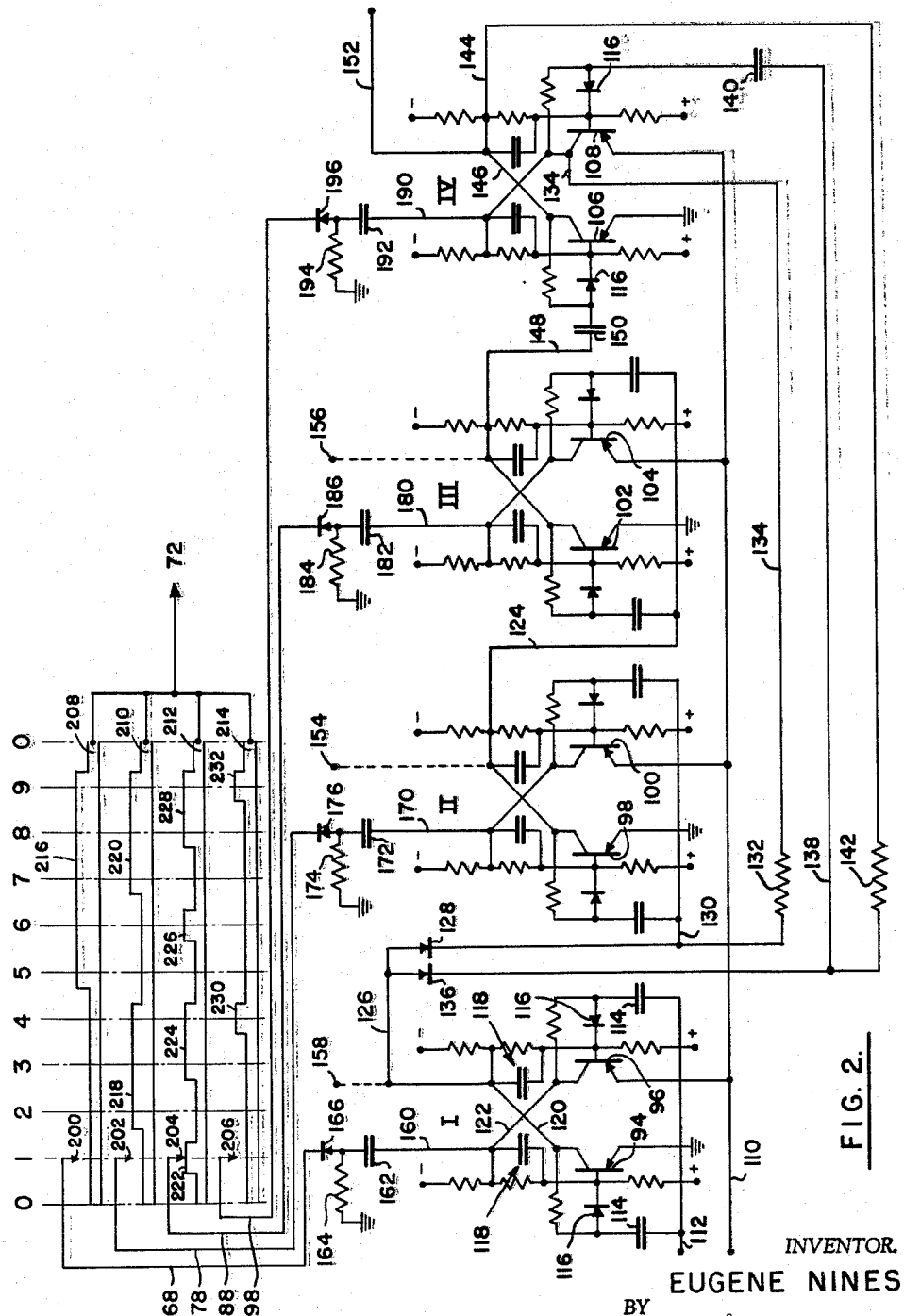
FIGURE 2 is a wiring diagram illustrating particularly the details of a binary-decimal counter of a type used in the apparatus and its association with switching means for presetting an arbitrary factor into the apparatus.

All of the binary-decimal counters shown in FIGURE 1 are fundamentally the same, and their construction and operation will become clear from consideration of FIGURE 2.

Referring to that figure, which shows the combination of a binary-decimal counter with its associated selector switch, the figure being typical of any one of the pairs of these elements, 56 and 64, 58 and 66, 60 and 68, or 62 and 70, all of these pairs being the same, each binary-decimal counter comprises four stages indicated at I, II, III and IV. The first stage I comprises the left and right hand transistors 94 and 96, and the pairs of transistors comprised in the other stages are, respectively, 98 and 100, 102 and 104 and 106 and 108. Each of the right-hand transistors has its emitter directly connected to a reset line 110 which, during counting operation, is grounded, but opened when reset is to be effected or counting is to be stopped. An ordinary switch may be used for this purpose, though particularly for rapid action in stopping a count, the line 110 is desirably connected to a transistor switch (not shown).

The input connection for receiving operating (positive) pulses is indicated at 112, and in the case of the first stage connection is made from the emitter of transistor 52, previously described. Since the individual stages of the counter are identical, their interconnections being different as hereafter described, reference to details need only be made with respect to stage I. Each stage comprises a bistable multivibrator of conventional type in which inputs are provided through capacitors such as 114 and diodes 116, passing positive pulses but suppressing negative pulses to the bases of the transistors. In the case of the first three stages the input connections to the capacitors of a pair are common. In the case of the fourth stage different connections are involved. Cross-coupling connections are made as indicated at 120 and 122 and involve the time-constant networks indicated at 118. Conventional biasing and load resistors are provided but need not be described.

If the counter was of ordinary binary type, each stage would be connected to the next succeeding stage by a connection running from the collector of the left-hand transistor of the preceding stage to the input capacitors of the next following stage. The connection 124 between stages II and III is typical. However, to provide a binary-decimal counter which has a complete cycle in ten counts, the inter-stage connections are modified as will be now described. The collector of transistor 94 of the first stage is connected at 126 to a pair of diode switches. The first of these comprises the diode 128 connected at 130 to the input capacitors of the second stage. Its cathode is also connected through resistor 132 and line 134 to the collector of the right-hand transistor 108 of the fourth stage. When the last named collector is negative, the switch is open, and positive pulses from connection 126 may pass through the diode 128 to the second stage. But when the collector of transistor 108 is positive, the diode 128 is cut off and pulses will not be transmitted.

The second diode switch connected to 126 comprises the diode 136 which is connected at 138 through capacitor 140 to the base of transistor 108 through its associated diode 116. The cathode of diode 136 is connected through resistor 142 and connection 144 to the collector of the fourth stage transistor 106. When the last mentioned collector is negative, the diode 136 will pass positive pulses and so is open. On the other hand, when the last mentioned collector is positive the diode is cut off.

The tripping connection of transistor 108 of stage IV has been described. In the case of the left-hand transistor of this stage positive pulses from the collector of third stage transistor 102 pass through line 148 and capacitor 150 and the associated diode 116 to its base.

The output connection from the counter is indicated at 152 and passes input pulses to the next counter of the cascaded group.

At this point reference may be made to the fact that the binary-decimal counter just described may be identically used at 78 and 80 (FIGURE 1). For purposes of feeding translators 86 and 88, there are used output connections which are not used in the counters 56, 58, 60 and 62, and these connections, for clarity, are indicated in phantom fashion at 154, 156 and 158.

The operation of the binary-decimal counters will be described later in connection with the operation of the entire system.

Continuing with FIGURE 2, stage I has an output connection 160 to the collector of right-hand transistor 96 through the cross-connection 122. Pulses are fed from 160 through the differentiating network comprising the capacitor 162 and resistor 164. The junction of these two elements is connected through diode 166 to a line 168.

In similar fashion the collector of transistor 100 delivers signals through connection 170, the differentiator 172, 174 and diode 176 to line 178. Similar connections are provided in the third stage, the collector of transistor 104 being connected at 180 to the differentiator 182, 184 and through diode 186 to the line 188. The fourth stage has similar connections from the collector of its transistor 108 through 190 to the differentiator 192, 194, whence positive pulses pass through diode 196 to the line 198.

The lines 168, 178, 188 and 198 are connected to respective contacts 200, 202, 204 and 206 of a four-bank switch which is one of the selector switches 64, 66, 68 or 70, previously referred to. This switch is conveniently a rotary switch of conventional type, but it may be more effectively diagrammed in FIGURE 2 in a developed form, and as shown there are the contact elements 208, 210, 212 and 214. These elements are movable together, and during successive steps, of which there are ten, they occupy the positions relative to the contacts 200, 202, 204 and 206 as indicated by the effective value numerals at the top of the figure. These numerals correspond to digital setting positions of the switch. As will be seen from the diagram, the contact 200 engages the portion 216 of contact 208 when the settings are 5, 6, 7, 8 or 9. Similarly, the contact 202 engages 210 at portions 218 and 220 thereof when the settings are 2, 3, 4, 7, 8 or 9. The contact 204 engages 212 at the portions 222, 224, 226 and 228 thereof when the settings are 1, 3, 4, 6, 8 or 9. Contact 206 engages portions 230 and 232 of contact 214 when the settings are 4 or 9. All of the contacts 208, 210, 212 and 214 are joined to the summing connection 72.

The overall operation of the device will now be described with additional reference to FIGURE 3 which diagrams the operations occurring upon the introduction of input pulses as from the turbine meter 4.

Figure 3:
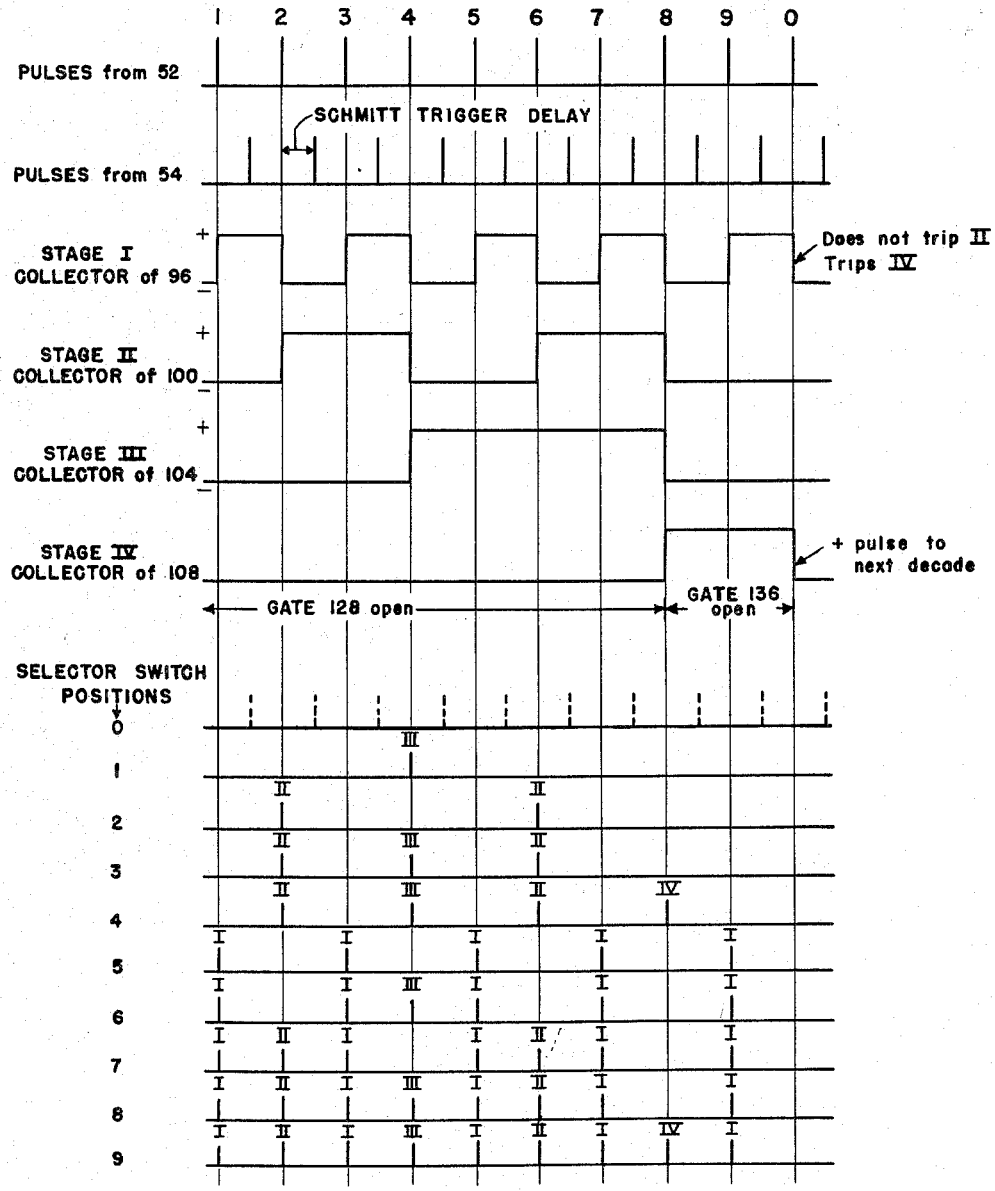
FIGURE 3 is a diagram illustrative of the operation of the apparatus.

The uppermost graph in FIGURE 3 indicates a series of ten pulses emitted through the emitter follower 52 when the trigger 28 is tripped to its astable state. The second graph in that figure shows the pulses emitted from the emitter follower 54 as the trigger circuit reverts to its stable state. The time delay of the trigger circuit established by the network 36 produces a trigger delay which is shorter than the closest interval between the actuating pulses which may be expected in use. Accordingly, the pulses from the followers 52 and 54 alternate. Passing, for the present, consideration of the pulses from follower 54, consideration will now be given to the operation of the first binary-decimal counter 56, with reference to FIGURE 2.

The next four graphs in FIGURE 3 illustrate the counting action which occurs. They represent the more negative and more positive conditions of the collectors of the respective transistors 96, 100, 104 and 108, i.e. the right-hand transistors of the successive stages. The collectors of the left-hand transistors, of course, have alternate but simultaneous excursions of polarity. Assuming a start from the beginning of a cycle (reset condition) before the first pulse indicated the transistors for which the graphs are drawn are cut off so that their collectors are in the more negative condition. Upon receipt of the first pulse the collector of transistor 96 swings positive. The collector of companion transistor 94 swings negative, producing a negative pulse on line 126 which is without effect. At this time gate 128 is open and gate 136 is closed, gate 128 being open because at this time the collector of transistor 108 is negative. Gate 136 is closed because the collector of transistor 106 is positive, relatively speaking, the transistor being conductive so that the actual potential of the collector is near ground.

When the second pulse is received from follower 52, the first stage of the counter is thrown to its reverse state, the collector of transistor 94 becoming positive to emit a positive pulse on line 126. Through gate 128 this positive pulse trips the second stage as indicated on the graph. A positive pulse, however, is blocked by the diode gate 136. Counting then proceeds in ordinary binary fashion, with division by two at each stage, with the results graphically illustrated up to and including the reception of the eighth pulse.

The reception of the eighth pulse, however, in effecting triggering of the fourth stage, reverses the states of the transistors therein so that the gate 136 is opened and gate 128 is closed. This, then, establishes a new interconnection. While the ninth pulse triggers the first stage, the tenth pulse in triggering the first stage does not effect transition of the second stage because of the closure of the gate 128 to prevent the passage of a triggering pulse to this second stage. Accordingly the second stage remains in its previous condition which is that normal to it at the beginning of a counting cycle. Since no transition occurs in the second stage there is none in the third stage. The tenth pulse, however, in tripping the first stage, now trips the fourth stage through gate 136, causing the fourth stage to revert to its initial condition. At the same time gate 128 is opened and gate 136 closed. Thus a complete cycle of operation occurs at a count of ten. As the fourth stage reverts to its initial condition a positive output pulse is emitted on line 152 to the next counter. The next and succeeding counters then receive input pulses, one for each ten counts of the preceding counter so that they count, effectively, in the decimal system.

Consideration may now be given to the effective multiplication of the counts by a preselected factor.

Whereas the interconnections between the counter stages previously referred to were from the collectors of the left-hand transistors, attention may now be directed to the collectors of the right-hand transistors which emit positive pulses to the respective lines 168, 178, 188 and 198, these positive pulses being emitted as the right-hand transistors become conductive so that their collectors swing positive as illustrated by the rises in the graphs relating to these collectors. Positive pulses then occur on the lines just referred to simultaneously with pulses emitted from the follower 52.

By considering the switch positions illustrated in FIGURE 2 and the graph pulses corresponding to the switch positions there will be drawn a picture of the pulses which are provided on the line 72. (First, assume that switch 74 is open.)

Assume that one of the selector switches 64, 66, 68 or 70 has its setting at zero. No pulse will then be emitted to the line 72 therethrough. Consequently, the count appearing in the order to which it corresponds will be effectively multiplied by zero.

If the switch setting is at 1 an examination of the switch diagram will show that as the count proceeds a pulse will be transmitted to the summing line 72 when stage 3 is actuated to produce a positive excursion of the collector of its transistor 104. This will be the sole pulse transmitted in a cycle of ten counts, so that the count in the corresponding order is effectively multiplied by 0.1.

If the setting is at 2, two pulses are emitted from stage II and multiplication is effectively by the factor 0.2. The notations on the graphs of FIGURE 3 for the other positions and reference to the switch positions in FIGURE 2 will make clear how, for each setting a number of pulses is emitted in a cycle of ten corresponding to the setting, with consequent effective multiplication, in the order considered, by the decimal corresponding to $\frac{1}{10}$ of the setting. It will be seen that in various of the settings pulses are emitted to the summing connection at 72 from a number of the stages in each complete cycle; in fact from all of the stages when the setting is 9.

It will now be evident why the binary-decimal counters 56, 58, 60 and 62 are respectively designated in FIGURE 1 as tenths, hundredths, thousandths, and ten-thousandths. The counts entering the first of these counters are selected for passage to the summing connection 72 in such fashion as to be multiplied by a decimal of which the respective settings are the digits. For example, suppose the respective switch settings are 7, 2, 0, 3. Then multiplication is effected by the decimal 0.7203.

Still considering switch 74 opened, the counts multiplied by the factor as stated are delivered from connection 72 to the units and tens counters 78 and 80, the output from the latter passing to the monostable multivibrator and register driver 82 and thence to the mechanical register 84. The counters 78 and 80 may be the same as the counter illustrated in FIGURE 2, each providing a decimal count in the fashion already described. The translators 86 and 88 are merely network matrices for conversion of the code of the counters to the code utilized by the display tubes 90 and 92. Such arrangement is conventional and need not be further described.

From the foregoing it will be evident that by the settings of the counters 56, 58, 60 and 2, multiplication by any decimal having four places and ranging from 0.0001 to 0.9999 may be effected. (It will, of course, be evident that the assignment of a decimal point in the ultimate reading is arbitrary.)

It is highly desirable, however, to extend the range of multiplication to encompass not only the foregoing but the additional range 1.0000 to 1.9999, thus effectively doubling the range of multipliers. This is accomplished by the provision of the switch 74 which, when closed, will additionally provide to connection 72 the pulses shown in the second graph in FIGURE 3 derived from the follower 54. Because of the fact that, due to the trigger delay, these pulses alternate with those from the follower 52, which latter coincide with the pulses fed to the connection 72, there is no trouble which arises because of coincidence of pulses from the two sources 52 and 54. With the switch 74 closed, therefore, the counter 78 receives not only the counts which have been multiplied by the predetermined factor but additionally the full number of counts feeding the trigger circuit 28. Thus a unity factor is added, and if, using the same figures as before, the selector switches occupy the respective positions 7, 2, 0, 3, the effect is to multiply by the factor 1.7203. The range of the multiplying factor is, accordingly, substantially doubled. The pulses added by closure of switch 74 with contact 76 are indicated in dotted lines in the graph illustrating selector switch position zero. These same pulses would be added to those corresponding to other settings of the selector switch.

Obviously, additional unit factors may be introduced by a further extension of devices heretofore described. Such extension is simplified in FIGURE 1 in dotted lines. The output of diode 30 may be connected to another trigger 28' (of the monostable multivibrator type) feeding an inverter 40', corresponding to inverter 40, and through gate 54', corresponding to 54, to an additional contact 76' for switch 74. If the time for recovery of the trigger 28' is chosen to be different from the period of the astable state of trigger 28, and still shorter than the minimum time spacing of the input pulses, an additional series of pulses will be added to the line 72 so that for a setting of the selector switches to respective positions 7, 2, 0, 3, the effect will be to multiply by the factor 2.7203. This arrangement may obviously be further extended if desired.

It will be evident that the system described is capable of many uses. Still considering flow measurement, not only may flow be exhibited in any desired units, but by detecting a predetermined count in the usual fashion (on the register 84 and display tubes 92 and 90), control may be effected when a predetermined flow has taken place.

An additional use of the device is that of proportioning the flows of two or more fluids. By measuring each with a device as described, and setting predetermined multipliers, controls of valve or other devices may be effected depending upon whether the counts of one counter are less or greater than those of another. Comparison devices for effecting such results are known in the art.

In the case of vending of liquids such as gasoline or oil, the multiplying factor may be proportional to price per unit quantity. In such cases positive meters are generally required by law, and by causing these meters to deliver a multiple of ten pulses per unit volume of the commodity being vended there is no need for introducing a meter constant and the settings of the switches such as 64, 66, 68 and 70 may be directly in price per unit quantity. It will be evident that even if a meter constant must be introduced, a series of multiplying devices may be provided in cascade, the original pulses being fed to one multiplying factor unit to take care of one multiplier and the pulses emitted therefrom being fed to a second multiplier unit to introduce the second factor, thus giving rise to an output representing the multiplication of the original pulses by a pair of factors.

It will be evident that the invention is also applicable wherever variable measurements or indications may be translated into counts and useful information is obtainable by multiplying such counts by suitable factors which may be set into the apparatus.

It will be clear that various changes in details of construction and operation may be made without departing from the invention as defined in the following claims.

What is claimed is:

1. In combination, a plurality of counters in cascade adapted to receive a first series of pulses, each counter passing to the next succeeding counter pulses which are a predetermined submultiple of the pulses received by it, selectively positionable switching means individually connected to each of said counters to receive pulses therefrom and emit a number of pulses constituting a predetermined fraction of its received pulses, the fraction depending upon the selective position thereof, means feeding the pulses from all of said switching means, such pulses constituting a second series, to a common terminal, and selective means feeding additionally to said terminal a third series of pulses, non-coincident with those of said second series, controlled to bear an integral multiple relationship to the pulses of the first series, said multiple relationship including a unity relationship, and means connected to said terminal and counting the total pulses thereat.

2. In combination, a plurality of counters in cascade adapted to receive a first series of pulses, each counter passing to the next succeeding counter pulses which are a predetermined submultiple of the pulses received by it, selectively positionable switching means individually connected to each of said counters to receive pulses therefrom and emit a number of pulses constituting a predetermined fraction of its received pulses, the fraction depending upon the selective position thereof, means feeding the pulses from all of said switching means, such pulses constituting a second series, to a common terminal, and selective means feeding additionally to said terminal a third series of pulses, non-coincident with those of said second series, controlled to bear an integral multiple relationship to the pulses of the first series, said multiple relationship including a unity relationship, the last mentioned means comprising at least one monostable multivibrator receiving pulses of the first series to trip it to its stable state and providing said third series of pulses upon reversion to its stable state, and means connected to said terminal and counting the total pulses thereat.

3. In combination, a plurality of decimal counters in cascade adapted to receive a first series of pulses, each counter passing to the next succeeding counter pulses which are a decimal submultiple of the pulses received by it, selectively positionable switching means individually connected to each of said counters to receive pulses therefrom and emit a number of pulses constituting a predetermined fraction of its received pulses, the fraction depending upon the selective position thereof, means feeding the pulses from all of said switching means, such pulses constituting a second series, to a common terminal, and selective means feeding additionally to said terminal a third series of pulses, non-coincident with those of said second series, controlled to bear an integral multiple relationship to the pulses of the first series, said multiple relationship including a unity relationship, and means connected to said terminal and counting the total pulses thereat.

4. In combination, a plurality of decimal counters in cascade adapted to receive a first series of pulses, each counter passing to the next succeeding counter pulses which are a decimal submultiple of the pulses received by it, selectively positionable switching means individually connected to each of said counters to receive pulses therefrom and emit a number of pulses constituting a predetermined fraction of its received pulses, the fraction depending upon the selective position thereof, means feeding the pulses from all of said switching means, such pulses constituting a second series, to a common terminal, and selective means feeding additionally to said terminal a third series of pulses, non-coincident with those of said second series, controlled to bear an integral multiple relationship to the pulses of the first series, said multiple relationship including a unity relationship, the last mentioned means comprising at least one monostable multivibrator receiving pulses of the first series to trip it to its astable state and providing said third series of pulses upon reversion to its stable state, and means connected to said terminal and counting the total pulses thereat.

5. In combination, a plurality of counters in cascade adapted to receive a first series of pulses, each counter passing to the next succeeding counter pulses which are a predetermined submultiple of the pulses received by it, selective means individually connected to each of said counters to receive pulses therefrom and emit a number of pulses constituting a predetermined fraction of its received pulses, the fraction depending upon the selective condition thereof, means feeding the pulses from all of said selective means, such pulses constituting a second series, to a common terminal, and selective means feeding additionally to said terminal a third series of pulses, noncoincident with those of said second series, controlled to bear an integral multiple relationship to the pulses of the first series, said multiple relationship including a unity relationship, and means connected to said terminal and counting the total pulses thereat.

6. In combination, a plurality of counters in cascade adapted to receive a first series of pulses, each counter passing to the next succeeding counter pulses which are a predetermined submultiple of the pulses received by it, selective means individually connected to each of said counters to receive pulses therefrom and emit a number of pulses constituting a predetermined fraction of its received pulses, the fraction depending upon the selective condition thereof, means feeding the pulses from all of said selective means, such pulses constituting a second series, to a common terminal, and selective means feeding additionally to said terminal a third series of pulses, noncoincident with those of said second series, controlled to bear an integral multiple relationship to the pulses of the first series, said multiple relationship including a unity relationship.

References Cited in the file of this patent
UNITED STATES PATENTS

| | | |
|---|---|---|
| 1,919,803 | Roetken | July 25, 1933 |
| 2,937,337 | Jones et al. | May 17, 1960 |
| 2,977,046 | Dobner et al. | Mar. 28, 1961 |
| 3,081,031 | Livesay | Mar. 12, 1963 |

OTHER REFERENCES

Shulman: "Accurate Tachometry Methods With Electronic Counters," Communications and Electronics, November 1954, pages 452–455.

Rigby: Analog-to-Digital Data Converter (Electronics), January 1956, pp. 152–155.